United States Patent
Yoshioka

(10) Patent No.: US 9,061,455 B2
(45) Date of Patent: Jun. 23, 2015

(54) INJECTION NOZZLE TOUCH MECHANISM FOR AN INJECTION MOLDING MACHINE

(71) Applicant: FANUC CORPORATION, Minamitsuru-gun, Yamanashi (JP)

(72) Inventor: Mitsushi Yoshioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/100,708

(22) Filed: Dec. 9, 2013

(65) Prior Publication Data

US 2014/0161925 A1  Jun. 12, 2014

(30) Foreign Application Priority Data

Dec. 11, 2012 (JP) .................................. 2012-270689

(51) Int. Cl.
  *B29C 45/17* (2006.01)
  *B29C 45/18* (2006.01)
  *B29C 45/20* (2006.01)
(52) U.S. Cl.
  CPC .................. *B29C 45/20* (2013.01); *B29C 45/17* (2013.01); *B29C 45/18* (2013.01)
(58) Field of Classification Search
  CPC .......... B29C 45/17; B29C 45/18; B29C 45/20
  USPC ....................................................... 425/569
  See application file for complete search history.

(56) References Cited

U.S. PATENT DOCUMENTS

| | | | | |
|---|---|---|---|---|
| 4,917,595 A | * | 4/1990 | Nakamura et al. | 425/567 |
| 4,950,144 A | * | 8/1990 | Watanabe et al. | 425/135 |
| 6,186,764 B1 | * | 2/2001 | Murase et al. | 425/226 |
| 2009/0011064 A1 | * | 1/2009 | Satou | 425/150 |
| 2011/0142982 A1 | * | 6/2011 | Kitta et al. | 425/542 |
| 2011/0151048 A1 | * | 6/2011 | Schad et al. | 425/574 |
| 2012/0087999 A1 | * | 4/2012 | Miyagawa et al. | 425/134 |
| 2012/0128813 A1 | * | 5/2012 | Takemoto et al. | 425/574 |
| 2013/0330436 A1 | * | 12/2013 | Kuroda et al. | 425/145 |
| 2014/0088757 A1 | * | 3/2014 | Inami et al. | 700/200 |
| 2014/0183771 A1 | * | 7/2014 | Ikarashi et al. | 264/40.3 |

FOREIGN PATENT DOCUMENTS

| | | |
|---|---|---|
| JP | 5269797 A | 10/1993 |
| JP | 9-277306 A | 10/1997 |
| JP | 2001-315157 A | 11/2001 |

OTHER PUBLICATIONS

Office Action mailed May 20, 2014, corresponds to Japanese patent application No. 2012-270689.

* cited by examiner

*Primary Examiner* — Tim Heitbrink
(74) *Attorney, Agent, or Firm* — Lowe Hauptman & Ham, LLP

(57) ABSTRACT

A plurality of connecting rods are attached to an injection device located opposite a stationary platen on a base structure of an injection molding machine. The stationary platen is provided with a magnetism generating unit formed of a permanent magnet, and the connecting rods are provided with a magnetic body. As the magnetism generating unit and the magnetic body are attracted to each other by magnetism, a nozzle of an injection unit is brought into contact with a mold. By this structure, the stationary platen can be prevented from inclining during nozzle touch operation.

7 Claims, 9 Drawing Sheets

INJECTION NOZZLE TOUCH MECHANISM FOR AN INJECTION MOLDING MACHINE

RELATED APPLICATIONS

The present application claims priority to Japanese Application Number 2012-270689, filed Dec. 11, 2012, the disclosure of which is hereby incorporated by reference herein in its entirety.

BACKGROUND OF THE INVENTION

1. Field of the Invention

The present invention relates to a nozzle touch mechanism of an injection molding machine, configured to prevent a stationary platen from inclining during nozzle touch operation.

2. Description of the Related Art

In a mold clamping mechanism section of an injection molding machine, a stationary platen and a rear platen are connected to each other by a plurality of tie-bars, and a movable platen is disposed between these platens for movement along the tie-bars. Further, stationary and movable mold halves of a mold are attached individually to facing machined surfaces of the stationary and movable platens, whereby mold clamping and opening operations are performed.

Furthermore, an injection unit is advanced and retracted relative to the stationary platen on a machine base, and a nozzle on the distal end of an injection cylinder of the injection unit is brought into close contact with a resin injection port of the stationary platen. In this state, a resin is introduced into the mold through the injection cylinder. A nozzle touch mechanism is provided to bring the nozzle into close contact with or separate it from the resin injection port of the stationary platen. The nozzle on the distal end of the injection cylinder is configured to be pressed against the resin injection port of the stationary platen by the nozzle touch mechanism during continuous molding operation.

FIGS. 11 and 12 are views showing the entire configuration of an injection molding machine comprising a nozzle touch mechanism section. FIGS. 11 and 12 show states where the nozzle is untouched and touched, respectively.

The injection molding machine comprises a mold clamping section Mc and an injection section Mi on a machine base (not shown). The injection section Mi serves to melt a resin material (pellets) by heating and inject the molten resin material into a cavity of a mold 40 (comprising movable and stationary mold halves 40a and 40b). The mold clamping section Mc serves mainly to open and close the mold 40.

The injection section Mi will be described first. A nozzle 2 is attached to the distal end of an injection cylinder 1, and a screw 3 is inserted in the injection cylinder 1. The screw 3 is provided with a resin pressure sensor 5, such as a load cell, configured to detect the resin pressure based on a pressure on the screw 3.

The screw 3 is rotated by a screw-rotation servomotor through a transmission mechanism 6 comprising pulleys, belt, etc. Further, the screw 3 is axially moved by an injection device advancing/retracting mechanism 8. Reference numeral 4 denotes a hopper that supplies the resin to the injection cylinder 1.

The following is a description of the mold clamping section Mc. The mold clamping section Mc comprises a rear platen 31, movable platen 30, tie-bars 32, stationary platen 33 secured on a base structure 9, crosshead 34, and ejector mechanism 35. The rear platen 31 and the stationary platen 33 are connected to each other by the tie-bars 32, and the movable platen 30 is located so as to be guided by the tie-bars 32. The movable and stationary mold halves 40a and 40b are attached to the movable and stationary platens 30 and 33, respectively. If the crosshead 34 is advanced or moved to the right in FIGS. 11 and 12, the movable platen 30 is advanced to close the mold.

The following is a description of the molding operation by means of the injection molding machine. If a movable platen advancing/retracting motor (not shown) is rotated forward, a ball screw shaft 38 is rotated forward. Thereupon, the crosshead 34 threadedly engaged with the ball screw shaft 38 is advanced (to the right in FIG. 1), so that the movable platen 30 is also advanced.

If the movable mold half 40a attached to the movable platen 30 contacts the stationary mold half 40b attached to the stationary platen 33 (or if the mold is closed), a mold clamping process is started. In the mold clamping process, a mold clamping force is generated in the mold 40 by further driving the movable platen advancing/retracting motor forward. Further, the cavity in the mold 40 is filled with the molten resin as a geared motor M1 for injection device advance and retraction of the injection device advancing/retracting mechanism 8, attached to the injection section Mi, is driven so that the screw 3 advances axially.

In a mold opening process, if the movable platen advancing/retracting motor is driven in the reverse direction, the ball screw shaft 38 is rotated in the reverse direction. As this is done, the crosshead 34 is retracted, a toggle mechanism is operated to bend, and the movable platen 30 is retracted toward the rear platen 31. When the mold opening process is completed, an ejector pin (not shown) is pushed out of the movable mold half 40a, whereby a molded article is ejected from the movable mold half 40a.

If the nozzle touch mechanism in the state of FIG. 11 is shifted to the state of FIG. 12 so that a nozzle touch occurs, a moment equivalent to the product of a nozzle touch force and the distance from the lower surface of the stationary platen to the nozzle center is generated, possibly causing the stationary platen to tilt or overturn.

Japanese Patent Application Laid-Open No. 9-277306 discloses a nozzle touch mechanism configured so that a pair of rotation/linear motion conversion mechanisms are arranged axially symmetrically with respect to the center of an injection unit. In this configuration, the points of action of the respective screw shafts of the rotation/linear motion conversion mechanisms on the stationary platen are made axially symmetrical with respect to the point of action of a nozzle of an injection cylinder, so that the stationary platen can be prevented from being inclined or overturned by a nozzle touch.

In the nozzle touch mechanism described above, the stationary platen can be prevented from inclining or overturning as the point of action of a nozzle of an injection cylinder is made axially symmetrical with respect to the points of action of the respective screw shafts of the rotation/linear motion conversion mechanisms on the stationary platen, but connecting rods may hinder the maintenance of a swivel of the injection unit or the nozzle tip. Since a nozzle touch mechanism section is located near a front plate of an injection molding machine, moreover, the maintenance of a screw joint is not easy.

Furthermore, Japanese Patent Application Laid-Open No. 2001-315157 discloses a nozzle touch mechanism of an injection molding machine, which uses an electromagnet to bring a nozzle into contact with a sprue bushing of a mold by pressure bonding with a predetermined force.

Since this nozzle touch mechanism uses the electromagnet, electric current must always be kept flowing while the force is being generated. If electric power consumption increases or power failure occurs when generation of the force is required, the pressing force of the nozzle becomes so small that a resin inevitably flows out.

SUMMARY OF THE INVENTION

Accordingly, the object of the present invention is to provide a nozzle touch mechanism of an injection molding machine, capable of economically performing reliable nozzle touch operation while preventing a stationary platen from inclining or overturning.

The present invention relates to a nozzle touch mechanism of an injection molding machine, configured to press a nozzle on a distal end of a cylinder against a mold attached to a stationary platen with a predetermined nozzle touch force. The stationary platen is secured to a base structure of the injection molding machine such that a front plate of an injection device is located opposite the stationary platen and the cylinder is secured to the front plate.

A first aspect of the nozzle touch mechanism of an injection molding machine comprises an injection device advancing/retracting unit configured to advance and retract the injection device and a plurality of connecting members arranged at the sides of the cylinder and provided to the injection device. Further, one of the stationary platen and the connecting members is provided with a magnetism generating unit comprising a permanent magnet, and the other with a magnetic body. The magnetism generating unit is configured to generate magnetism to attract the magnetic body, thereby bringing the nozzle into contact with the mold.

A second aspect of the nozzle touch mechanism of an injection molding machine comprises an injection device advancing/retracting unit configured to advance and retract the injection device, a plurality of magnetic connecting members arranged at the sides of the cylinder and supported at one ends thereof by a proximal portion of the cylinder, and a magnetism generating unit comprising a permanent magnet provided on that part of the stationary platen which faces the other ends of the magnetic connecting members. The magnetism generating unit is configured to generate magnetism to attract the magnetic connecting members, thereby bringing the nozzle into contact with the mold.

A third aspect of the nozzle touch mechanism of an injection molding machine comprises an injection device advancing/retracting unit configured to advance and retract the injection device, a plurality of connecting members arranged at the sides of the cylinder and supported at one ends thereof by a proximal portion of the cylinder, a magnetic detachably-attaching plate detachably attached to the other ends of the connecting members, and a magnetism generating unit comprising a permanent magnet provided on that part of the stationary platen which faces the other ends of the connecting members. The magnetism generating unit is configured to generate magnetism to attract the magnetic detachably-attaching plate, thereby bringing the nozzle into contact with the mold.

A fourth aspect of the nozzle touch mechanism of an injection molding machine comprises an injection device advancing/retracting unit configured to advance and retract the injection device, a plurality of connecting members arranged at the sides of the cylinder and supported at one ends thereof by a proximal portion of the cylinder, a magnetism generating unit comprising a permanent magnet provided on the other ends of the connecting members, and a magnetic body provided on that part of the stationary platen which faces the other ends of the connecting members. The magnetism generating unit is configured to generate magnetism to attract the magnetic body, thereby bringing the nozzle into contact with the mold.

Each of the connecting members may comprise a connecting rod and a connecting rod adjusting member, and the length of the connecting member may be adjusted by the connecting rod adjusting member.

Each of the connecting members may be slidably supported by a base secured to the proximal portion of the cylinder, and be secured to a pressing plate by a spring.

The magnetism generating unit may comprise a variable-polarity magnet, a polarity switching coil arranged around the variable-polarity magnet and configured to change the polarity of the variable-polarity magnet, and a fixed-polarity magnet, and the permanent magnet may comprise the variable-polarity magnet and the fixed-polarity magnet.

According to the present invention, there can be provided a nozzle touch mechanism of an injection molding machine, capable of economically performing reliable nozzle touch operation while preventing a stationary platen from inclining or overturning.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 11:
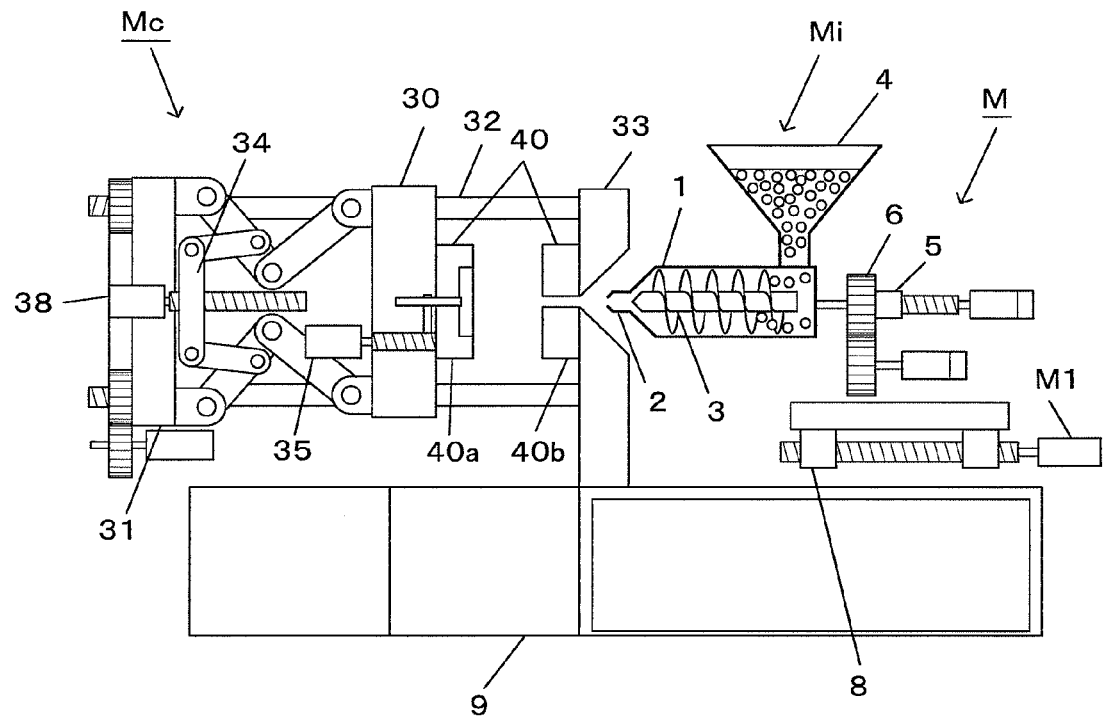
FIG. 11 is a view showing the entire configuration of an injection molding machine not in a nozzle touch state.
Figure 12:
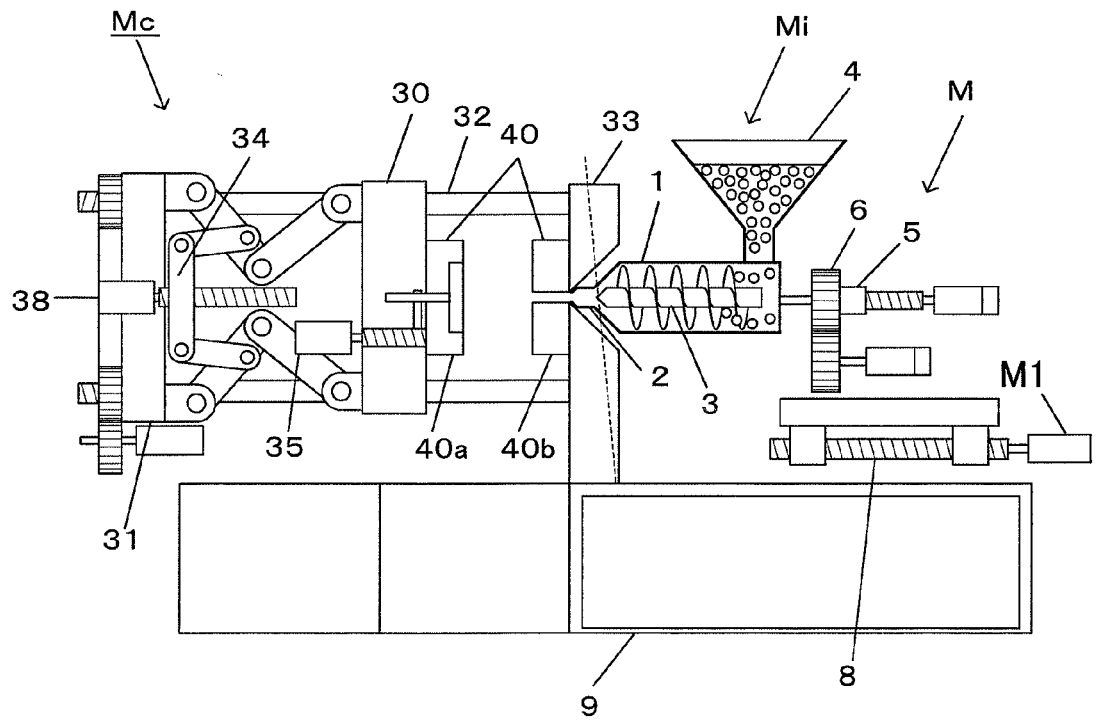
FIG. 12 is a view showing the entire configuration of the injection molding machine in the nozzle touch state.

The following is a description of some embodiments of a nozzle touch mechanism of an injection molding machine. An outline of the configuration of the injection molding machine is similar to that of the prior art example shown in FIGS. 11 and 12.

(Embodiment 1)

Embodiment 1 of the nozzle touch mechanism of the injection molding machine according to the present invention will be described with reference to FIGS. 1 and 2.

Figure 1:
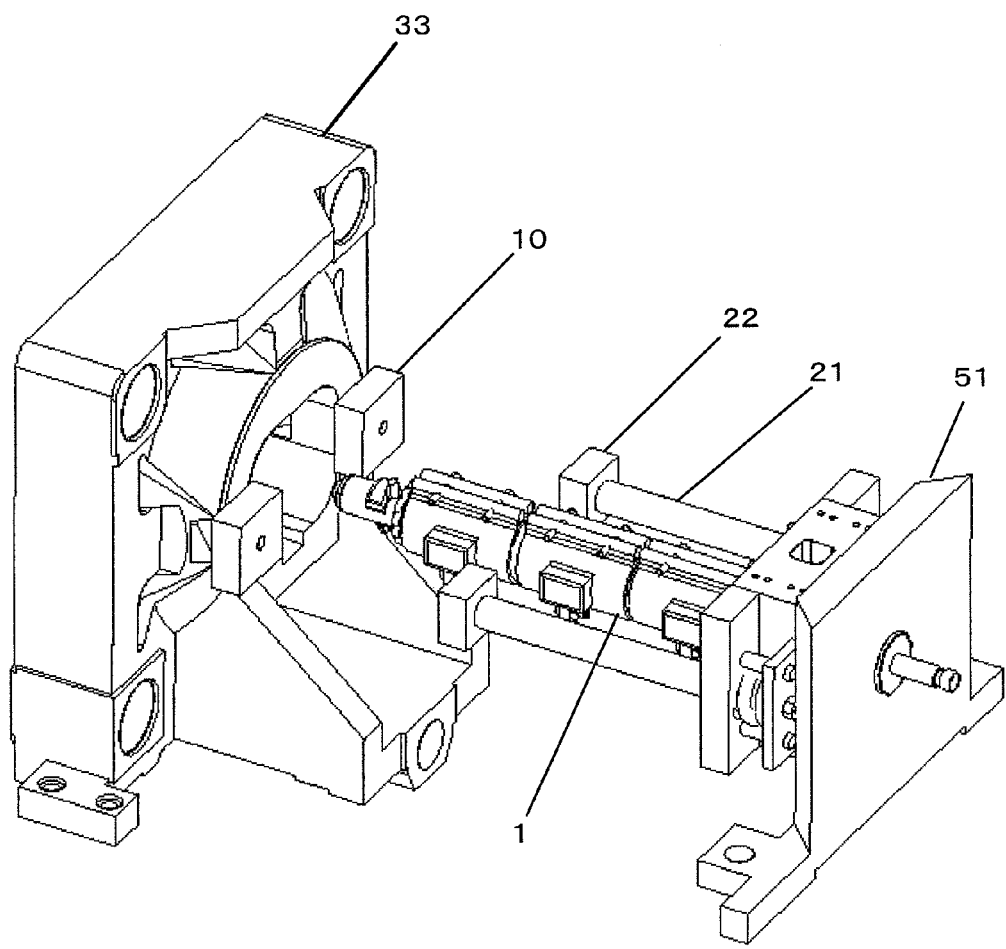
FIG. 1 is a perspective view illustrating Embodiment 1 of a nozzle touch mechanism of an injection molding machine according to the present invention.
Figure 2:
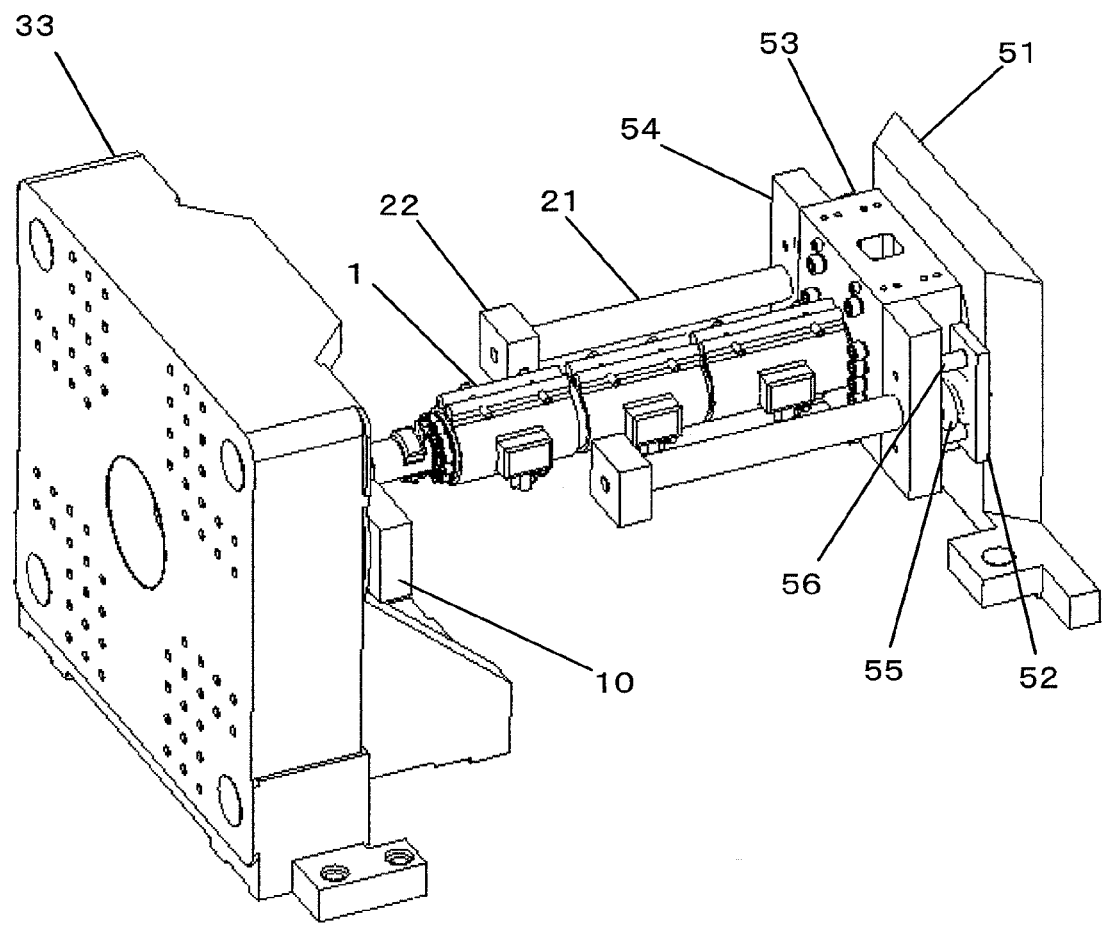
FIG. 2 is a perspective view of the nozzle touch mechanism of FIG. 1 taken from a different angle from that of FIG. 1.

In FIGS. 1 and 2, reference numeral 1 denotes an injection cylinder 1; 10, magnetism generating unit; 21, connecting rods; 22, detachably-attaching plates; 33, stationary platen; 51, front plate; 52, plate; 53, water jacket; 54, base; 55, spring; and 56, guide.

The connecting rods 21 and the detachably-attaching plates 22 are symmetrically disposed in pairs on the left and right sides of the injection cylinder 1. As in the conventional case, a nozzle touch mechanism section is advanced and retracted by utilizing torque fluctuation of a geared motor or servomotor or using a proximity switch. As the nozzle touch mechanism section is advanced, the injection cylinder 1, along with the connecting rods 21 and the detachably-attaching plates 22, moves (or advances) toward the stationary platen 33. As the magnetism generating unit 10 and the detachably-attaching plates 22 are magnetically connected, a nozzle touch on the tip of a nozzle is made and a nozzle touch state is maintained. The configuration of the magnetism generating unit 10 will be described later.

In the nozzle touch state, the detachably-attaching plate 22 is pressurized by the spring 55 (FIG. 2), besides being magnetically connected to the magnetism generating unit 10. Thus, the nozzle tip can be reliably brought into close contact with a mold even if the length of the nozzle or cylinder is changed due to temperature expansion or the reaction force of a resin pressure.

The spring 55 used in the nozzle touch mechanism of FIG. 2 and its surroundings will be described with reference to the enlarged view of FIG. 10.

Figure 10:
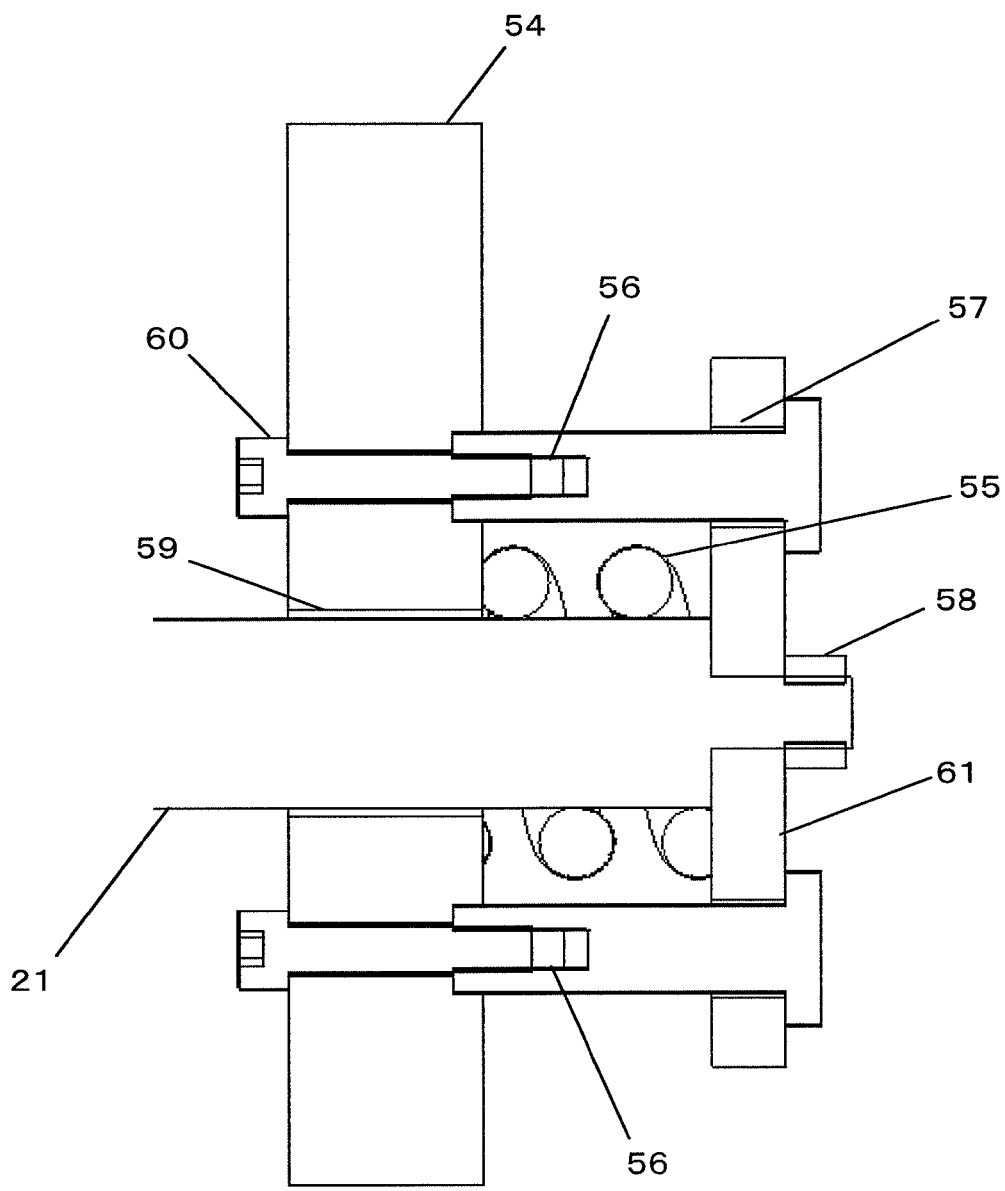
FIG. 10 is an enlarged view showing a spring used in the nozzle touch mechanism of FIG. 2 and its surroundings.

In FIG. 10, reference numeral 21 denotes a connecting rod; 54, base; 55, spring; 56, guides; 57 and 59, bushes; 58, nut; 60, bolts; and 61, pressing plate. One end of the connecting rod 21 is secured to the pressing plate 61 and slidably supported by the base 54 (forming a part of the injection cylinder 1), which is secured to the water jacket 53 or the front plate 51. The spring 55 is wound around that part of the connecting rod 21 which is located between the base 54 and the pressing plate 61.

Further, one end of the guide 56 on the side of the pressing plate 61 is larger in diameter than the other part, so that the pressing plate 61 is kept from moving toward the front plate 51.

Figure 5:
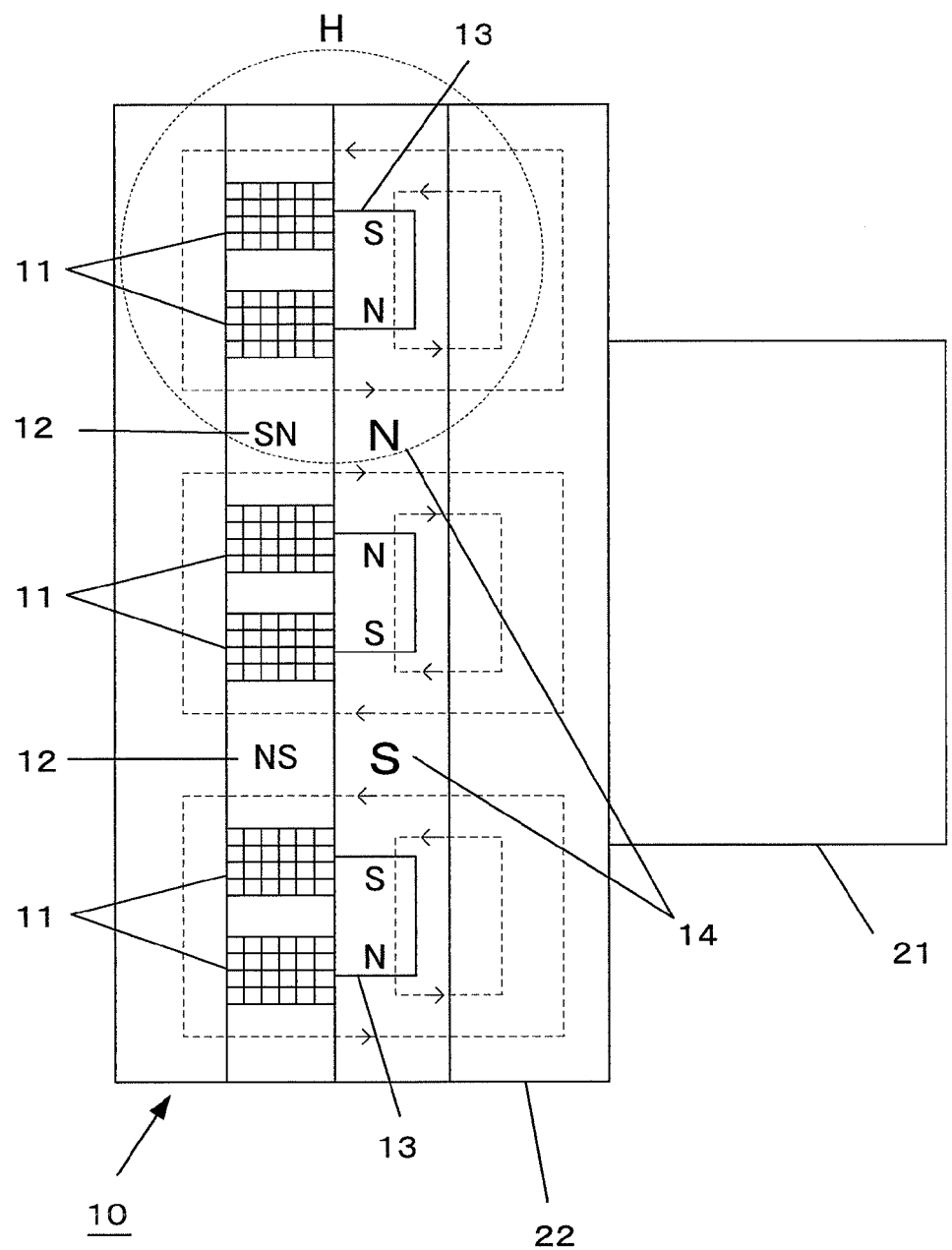
FIG. 5 is a diagram illustrating the magnetism generating unit of the nozzle touch mechanism of FIG. 1 in a magnetized state.
Figure 6:
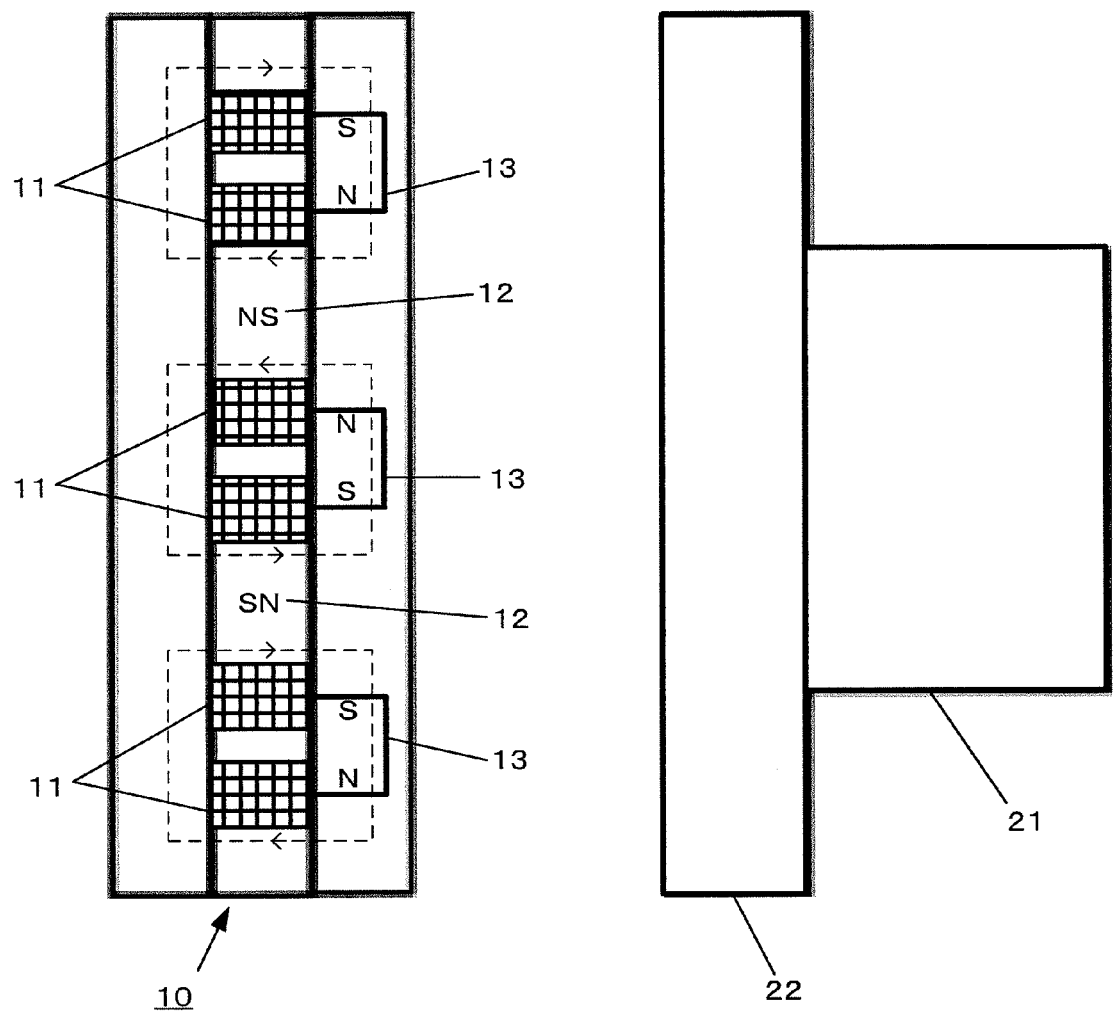
FIG. 6 is a diagram illustrating the magnetism generating unit of the nozzle touch mechanism of FIG. 1 in a demagnetized state.

FIGS. 5 and 6 are diagrams illustrating the magnetism generating unit of the nozzle touch mechanism of FIG. 1 in magnetized and demagnetized states, respectively.

In FIGS. 5 and 6, reference numeral 11 denotes electromagnetic coils; 12, alnico magnets; 13, neodymium magnets; 14, magnetic cores; 21, connecting rod; and 22, detachably-attaching plate.

Figure 7:
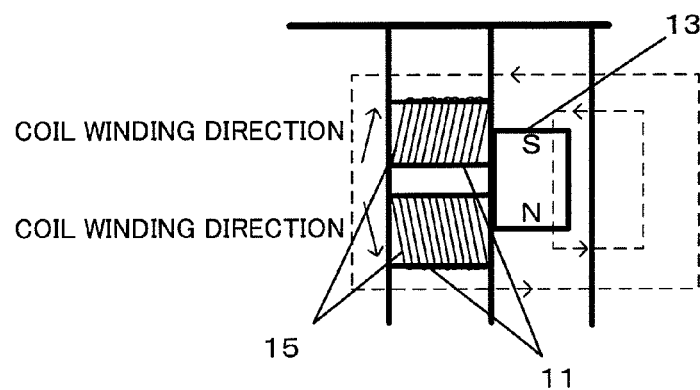
FIG. 7 is an enlarged diagram showing a portion surrounded by broken line H in FIG. 5.

The alnico magnets 12 are disposed between the electromagnetic coils 11. As shown in the enlarged diagram of FIG. 7 corresponding to a portion surrounded by broken line H in FIG. 5, the electromagnetic coils 11 are configured so that coil wires 15 are wound around shafts that extend from the alnico magnets 12 toward the neodymium magnets 13. In each two adjacent electromagnetic coils 11 in a pair, their respective coil wires 15 are oppositely wound.

The polarity of each alnico magnet 12 changes each time the electromagnetic coils 11 are energized. If the electromagnetic coils 11 in the demagnetized state are energized, the magnetized state shown in FIG. 5 is established. In this state, the alnico and neodymium magnets 12 and 13 are made homopolar so that lines of magnetic force 16 are formed as indicated by broken lines in FIG. 5. Thereupon, the magnetic cores 14 become strong magnets to be connected to the detachably-attaching plates 22.

The demagnetized state shown in FIG. 6 is established as the electromagnetic coils 11 in the magnetized state are energized. If the demagnetized state is established, the lines of magnetic force 16 cease to appear on the surfaces of the magnetic cores 14, as indicated by broken lines in FIG. 6. Thus, the detachably-attaching plates 22 are separated from the magnetism generating unit 10.

(Embodiment 2)

Embodiment 2 of the nozzle touch mechanism according to the present invention will be described with reference to FIG. 3.

Figure 3:
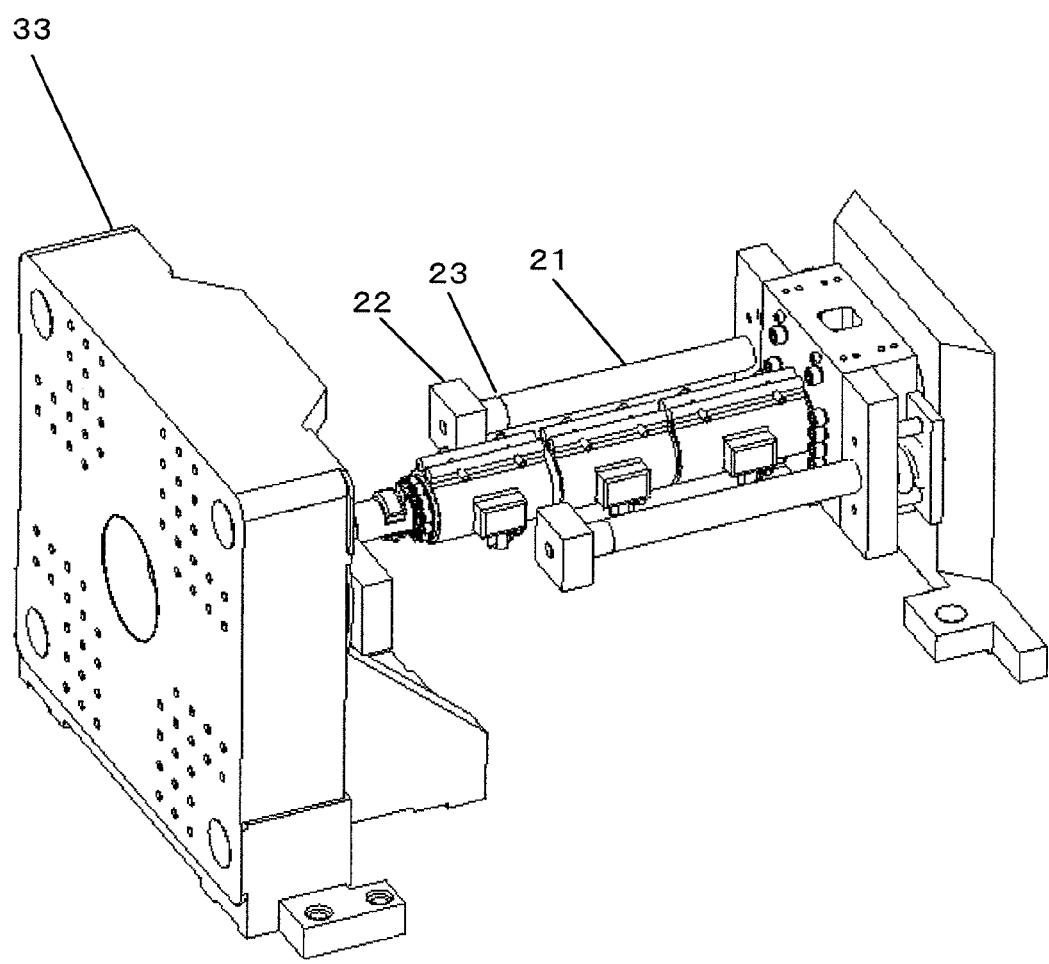
FIG. 3 is a perspective view illustrating Embodiment 2 of the nozzle touch mechanism of the injection molding machine according to the invention.

The nozzle touch mechanism shown in FIG. 3 differs from the nozzle touch mechanism of Embodiment 1 (FIG. 2) in that a connecting rod adjusting member 23 is provided between a connecting rod 21 and a detachably-attaching plate 22. While an injection cylinder 1 and a nozzle 2 vary in length, the connecting rod adjusting member 23 serves to adjust the length of the connecting rod 21 so that the tip of the nozzle 2 can appropriately contact a stationary platen 33 of a mold.

Figure 8:
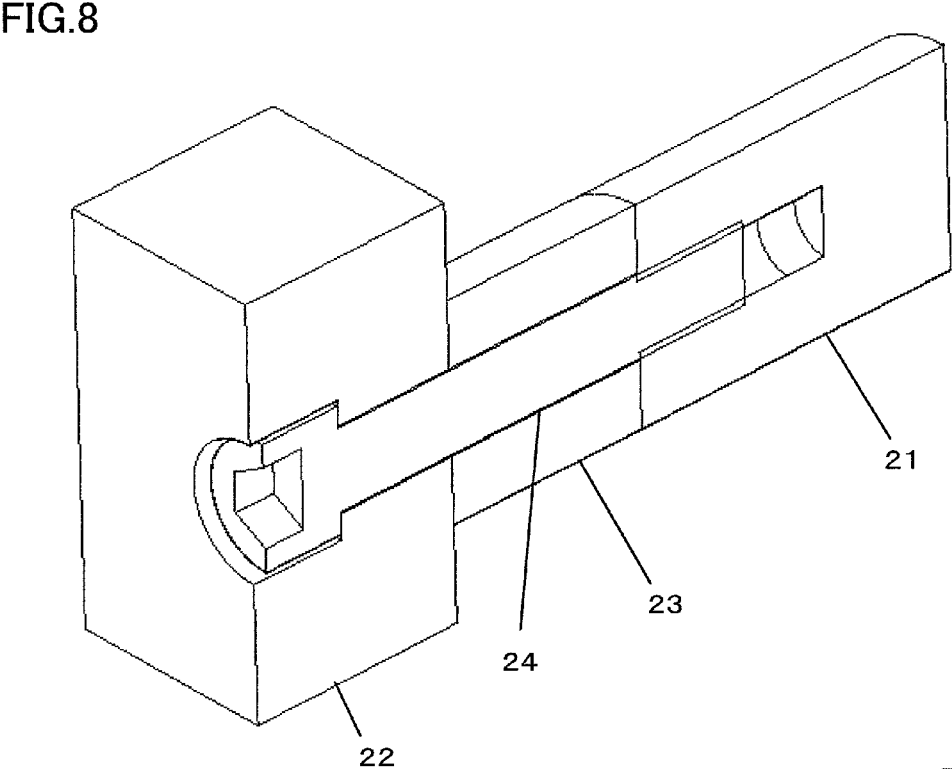
FIG. 8 is an enlarged view showing a first example of a connecting rod adjusting member in the nozzle touch mechanism of FIG. 3 and its surroundings.
Figure 9:
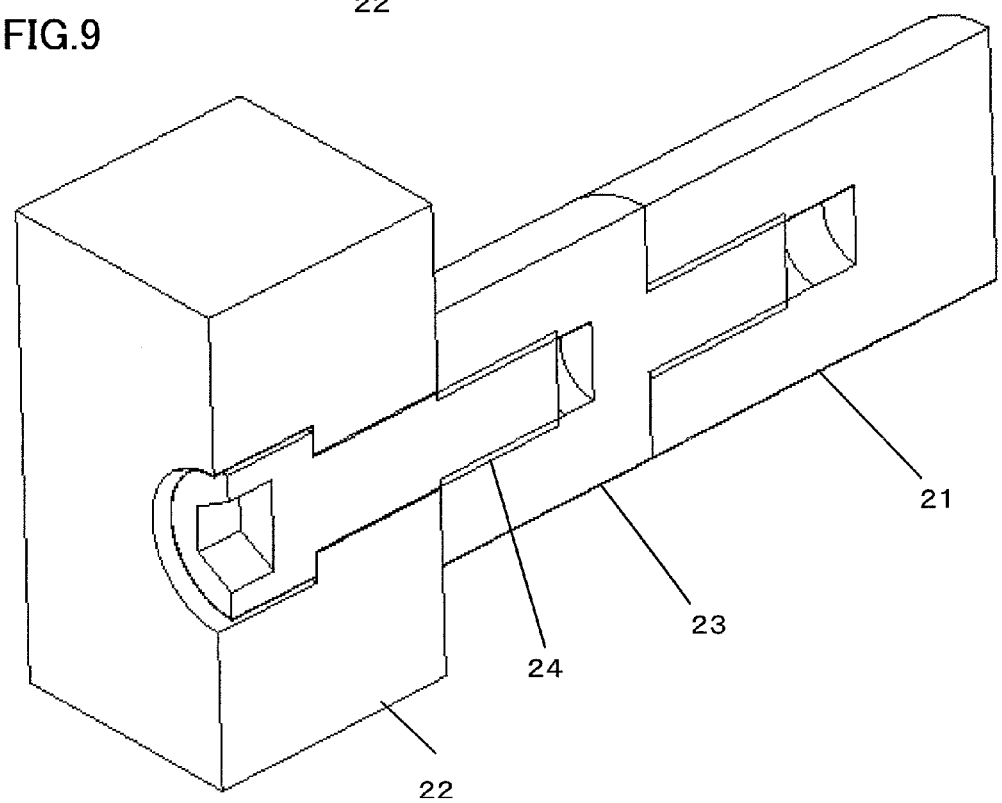
FIG. 9 is an enlarged view showing a second example of the connecting rod adjusting member in the nozzle touch mechanism of FIG. 3 and its surroundings.

FIGS. 8 and 9 are enlarged views showing the connecting rod adjusting member 23 in the nozzle touch mechanism of FIG. 3 and its surroundings.

In the example of FIG. 8, the connecting rod 21, detachably-attaching plate 22, and connecting rod adjusting member 23 are penetrated individually by holes, and a thread groove is formed on the inner surface of the hole in the connecting rod 21. A screw 24 having its proximal end portion secured to the detachably-attaching plate 22 penetrates the hole in the connecting rod 21, and an external thread formed on the tip end of the screw 24 is threadedly engaged with the thread groove of the hole in the rod 21. Thus, the length of a combination of the connecting rod 21, detachably-attaching plate 22 and connecting rod adjusting member 23 can be adjusted by rotating the detachably-attaching plate 22 relative to the connecting rod 21 and the connecting rod adjusting member 23.

In the example of FIG. 9, the distal end of the connecting rod adjusting member 23 is shaped so that it can be fitted into the connecting rod 21 in such a manner that an external thread formed thereon engages with an internal thread formed inside the connecting rod 21. Further, the screw 24 having one end portion secured to the detachably-attaching plate 22 penetrates holes that penetrate the detachably-attaching plate 22 and the connecting rod adjusting member 23. Also in the example of FIG. 9, the combination of the connecting rod 21, detachably-attaching plate 22, and connecting rod adjusting member 23 can be adjusted, although the range of the length adjustment is somewhat smaller than in the example of FIG. 8.

(Embodiment 3)

Embodiment 3 of the nozzle touch mechanism according to the present invention will be described with reference to FIG. 4.

Figure 4:
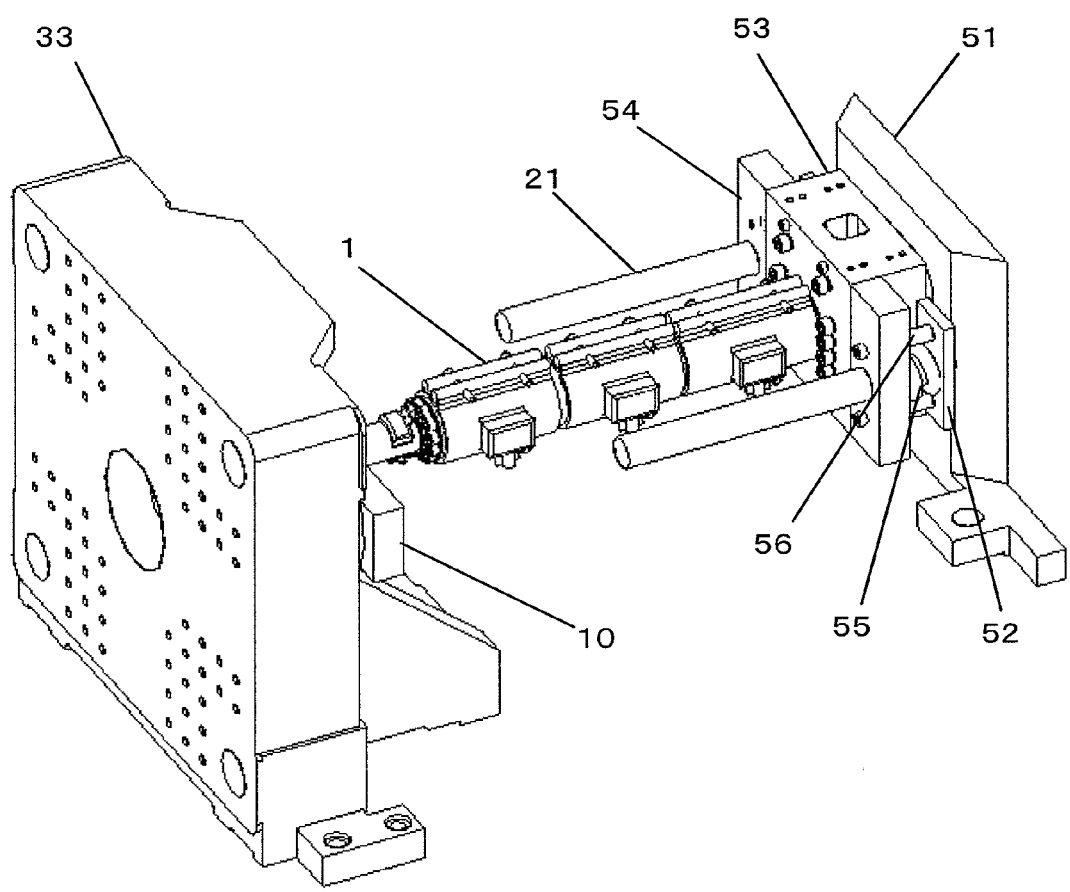
FIG. 4 is a perspective view illustrating Embodiment 3 of the nozzle touch mechanism of the injection molding machine according to the invention.

The nozzle touch mechanism shown in FIG. 4 differs from the nozzle touch mechanism of Embodiment 1 (FIG. 2) in that the detachably-attaching plates 22 of Embodiment 1 are omitted and connecting rods 21 are magnetic members. Thus, according to this embodiment, the nozzle touch mechanism is not provided with the detachably-attaching plates 22, so that the parts count can be reduced.

In the embodiments of the nozzle touch mechanism according to the present invention, the magnetism generating unit 10 is provided on the side of the stationary platen 33, the magnetic detachably-attaching plates 22 are provided on the side of the connecting rods 21, or the connecting rods 21 are provided as magnetic members. Alternatively, however, a magnetic member, e.g., a magnetic body, and the magnetism generating unit 10 may be provided, for example, on the sides of the stationary platen 33 and the connecting rods 21, respectively, only if the magnetism generating unit 10 and the detachably-attaching plates 22 (or the connecting rods 21, in the case where the detachably-attaching plates 22 is not used) are magnetically connected.

Although the neodymium and alnico magnets are used for the permanent magnet in the embodiments of the nozzle touch mechanism according to the present invention, moreover, they may be replaced with magnets of other types. In the present embodiment, furthermore, the magnetized and demagnetized states are switched in such a manner that the polarity of the alnico magnets is inverted by energizing the electromagnetic coils disposed around the alnico magnets. However, the polarity may also be changed by other means.

In the embodiments of the nozzle touch mechanism according to the present invention, moreover, the length adjustment of the connecting rod 21 in each connecting rod adjusting member 23 is performed by means of the screw 24 that penetrate the detachably-attaching plate 22, adjusting member 23, and connecting rod 21 or the screw that penetrates the detachably-attaching plate 22 and the adjusting member 23. However, other means may be used for the length adjustment.

The invention claimed is:

1. A nozzle touch mechanism of an injection molding machine, configured to press a nozzle on a distal end of a cylinder against a mold attached to a stationary platen with a predetermined nozzle touch force, wherein
the stationary platen is secured to a base structure of the injection molding machine such that a front plate of an injection device is located opposite the stationary platen and the cylinder is secured to the front plate, and the nozzle touch mechanism of the injection molding machine comprises:
an injection device advancing/retracting unit configured to advance and retract the injection device; and
a plurality of connecting members arranged at the sides of the cylinder and provided to position the injection device, and wherein
one of the stationary platen and the connecting members is provided with a magnetism generating unit comprising a permanent magnet, and the other with a magnetic body, and
the magnetism generating unit is configured to generate magnetism to attract the magnetic body, thereby bringing the nozzle into contact with the mold.

2. A nozzle touch mechanism of an injection molding machine, configured to press a nozzle on a distal end of a cylinder against a mold attached to a stationary platen with a predetermined nozzle touch force, wherein
the stationary platen is secured to a base structure of the injection molding machine such that a front plate of an injection device is located opposite the stationary platen and the cylinder is secured to the front plate, and
the nozzle touch mechanism of the injection molding machine comprises:
an injection device advancing/retracting unit configured to advance and retract the injection device;
a plurality of magnetic connecting members arranged at the sides of the cylinder and supported at one ends thereof by a proximal portion of the cylinder; and
a magnetism generating unit comprising a permanent magnet provided on that part of the stationary platen which faces the other ends of the magnetic connecting members, and wherein
the magnetism generating unit is configured to generate magnetism to attract the magnetic connecting members, thereby bringing the nozzle into contact with the mold.

3. A nozzle touch mechanism of an injection molding machine, configured to press a nozzle on a distal end of a cylinder against a mold attached to a stationary platen with a predetermined nozzle touch force, wherein
the stationary platen is secured to a base structure of the injection molding machine such that a front plate of an injection device is located opposite the stationary platen and the cylinder is secured to the front plate, and
the nozzle touch mechanism of the injection molding machine comprises:
an injection device advancing/retracting unit configured to advance and retract the injection device;
a plurality of connecting members arranged at the sides of the cylinder and supported at one ends thereof by a proximal portion of the cylinder;
a magnetic detachably-attaching plate detachably attached to the other ends of the connecting members; and
a magnetism generating unit comprising a permanent magnet provided on that part of the stationary platen which faces the other ends of the connecting members, and wherein
the magnetism generating unit is configured to generate magnetism to attract the magnetic detachably-attaching plate, thereby bringing the nozzle into contact with the mold.

4. A nozzle touch mechanism of an injection molding machine, configured to press a nozzle on a distal end of a cylinder against a mold attached to a stationary platen with a predetermined nozzle touch force, wherein
the stationary platen is secured to a base structure of the injection molding machine such that a front plate of an injection device is located opposite the stationary platen and the cylinder is secured to the front plate, and
the nozzle touch mechanism of the injection molding machine comprises:
an injection device advancing/retracting unit configured to advance and retract the injection device;
a plurality of connecting members arranged at the sides of the cylinder and supported at one ends thereof by a proximal portion of the cylinder;
a magnetism generating unit comprising a permanent magnet provided on the other ends of the connecting members; and
a magnetic body provided on that part of the stationary platen which faces the other ends of the connecting members, and wherein
the magnetism generating unit is configured to generate magnetism to attract the magnetic body, thereby bringing the nozzle into contact with the mold.

5. The nozzle touch mechanism of an injection molding machine according to claim 1, wherein each of the connecting member comprises a connecting rod and a connecting rod adjusting member, and the length of the connecting member is adjusted by the connecting rod adjusting member.

6. The nozzle touch mechanism of an injection molding machine according to claim 1, wherein each of the connecting members is slidably supported by a base secured to the proximal portion of the cylinder, and is secured to a pressing plate by a spring.

7. The nozzle touch mechanism of an injection molding machine according to claim 1, wherein the magnetism generating unit comprises a variable-polarity magnet, a polarity switching coil arranged around the variable-polarity magnet and configured to change the polarity of the variable-polarity magnet, and a fixed-polarity magnet, and the permanent magnet comprises the variable-polarity magnet and the fixed-polarity magnet.

* * * * *